United States Patent
Mani

(10) Patent No.: US 8,300,796 B2
(45) Date of Patent: Oct. 30, 2012

(54) METHOD AND SYSTEM FOR ENHANCED CALL NOTIFICATION AND TREATMENT

(75) Inventor: Babu Mani, Murphy, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1146 days.

(21) Appl. No.: 12/052,866

(22) Filed: Mar. 21, 2008

(65) Prior Publication Data
US 2009/0238354 A1 Sep. 24, 2009

(51) Int. Cl.
*H04M 5/00* (2006.01)

(52) U.S. Cl. ............ 379/257; 379/201.01; 379/207.13; 379/207.14; 379/207.15; 379/207.16; 379/88.19; 379/221.08; 379/211.02; 379/252; 379/88.02

(58) Field of Classification Search ............ 379/212.01, 379/211.02, 201.02, 88.02, 252
See application file for complete search history.

(56) References Cited

U.S. PATENT DOCUMENTS

| | | | |
|---|---|---|---|
| 2003/0215078 A1* | 11/2003 | Brahm et al. | 379/211.02 |
| 2004/0114747 A1* | 6/2004 | Trandal et al. | 379/211.02 |
| 2005/0105706 A1* | 5/2005 | Kokkinen | 379/201.01 |
| 2005/0213740 A1* | 9/2005 | Williams et al. | 379/211.02 |
| 2006/0023862 A1* | 2/2006 | Sutcliffe | 379/257 |
| 2006/0147021 A1* | 7/2006 | Batni et al. | 379/221.08 |
| 2006/0227957 A1* | 10/2006 | Dolan et al. | 379/212.01 |
| 2007/0003032 A1* | 1/2007 | Batni et al. | 379/88.19 |
| 2007/0071218 A1* | 3/2007 | Zhang | 379/221.09 |
| 2007/0140448 A1* | 6/2007 | Lin et al. | 379/93.17 |
| 2007/0291931 A1* | 12/2007 | DeMent | 379/418 |
| 2008/0159488 A1* | 7/2008 | Raja | 379/88.02 |
| 2008/0240081 A1* | 10/2008 | Sindhwani | 370/352 |
| 2010/0166166 A1* | 7/2010 | Smith et al. | 379/201.02 |

* cited by examiner

*Primary Examiner* — Joseph J Nguyen

(57) ABSTRACT

An application server that provides RBT treatment to a caller and simultaneously notifies the called party, as subscriber of the service facilitated by the present invention, of an incoming call, whereby the called party is able to select a treatment for the call to be presented to the caller based on input collected from the called party on a real-time basis.

22 Claims, 2 Drawing Sheets

METHOD AND SYSTEM FOR ENHANCED CALL NOTIFICATION AND TREATMENT

BACKGROUND

As used herein, the following abbreviations shall have the following meanings:
AT—Answer Tones
CAMEL—Customized Applications for Mobile Network Enhanced Logic
CPC—Calling Party's Category
CRBT—Color Ringback Tone
GMSC—Gateway MSC
HLR—Home Location Register
HSS—Home Subscriber Server
ISUP—ISDN User Part
LIDB—Line Information Database
MSC—Mobile Switching Center
RBT—Ringback Tone
SCP—Service Control Point
SIP—Session Initiation Protocol
SSP—Service Switching Point In a call made over a telecommunications system using a wireless infrastructure, wireline infrastructure or both, a calling party uses the telecommunication infrastructure to signal a called party. The party that initiates the call is referred to as the caller or calling party, and the party receiving the call is referred to as the called party or terminating party. Depending on the services provided, the calling party or called party may be the subscriber to the services.

RBT is a service wherein the called party is the subscriber. It enables the subscriber to substitute the regular audible ringing provided to a calling party with a tone or audio clip selected by the called party during the process of connecting a call. This service is also known as Color Ringback Tones (CRBT) and Answer Tones (AT). It is also possible to substitute the tone or the audio clip with other media content. Thus the RBT content presented to a caller can be video, text, graphics, photos, etc., only limited by the capabilities of the caller's handset and the transmission capabilities of the telecommunications network. RBT is a terminating service. In other words, the terminating user is the called party who subscribes to the RBT service and callers listen to RBT content as specified by the subscriber who is the called party.

With RBT, the subscriber is provided with the normal call notification while the caller is listening to the RBT content. If the subscriber answers the call, the caller is connected to the called party. Other services such as call waiting and caller identification have enriched the called party experience so as to assist the called party, here the subscriber of those services, in deciding how to handle an incoming call. There is also an enhanced version of call waiting, referred to as Call Waiting Deluxe which provides the called party with multiple choices for handling an incoming call presented as a call waiting call. However, such facility is not available when it is a first call, i.e., when the called party is idle.

SUMMARY

As noted, in RBT, the called party, who is the subscriber, is provided with the normal call notification while the caller is listening to the RBT content. The present invention is a method and system that, in an embodiment, provides RBT treatment to a caller and simultaneously notifies the called party, as subscriber of the service facilitated by the present invention, of an incoming call, whereby the called party is able to select a treatment for the call on a real-time basis.

DETAILED DESCRIPTION

In the present invention, a caller, who makes a call to a called party who is a RBT subscriber, will be provided with RBT content, such as music or other content, as selected by the RBT subscriber, while at the same time, an application server notifies the called party about the incoming call. The called party can be notified using existing messaging facilities, such as Short Message Service (SMS), or other suitable signaling means. Once notified of the incoming call, the subscriber can then choose one of several options, which include: immediate connection to the call; connect after x seconds, as determined by the subscriber; continue to play RBT until notified of call treatment; do not disconnect until notified of call treatment; forward to voicemail or to a third party; play announcement to caller and then terminate call; display a message to caller and then terminate the call; and change announcement or tone when current tone completes current cycle. Note that while the foregoing options are presented and acted upon, the call itself is not presented to the called party.

The RBT subscriber is notified of the incoming call in several ways, such as via a messaging facility, such as Short Message Service (SMS). Alternatively, the application server can request a Service Switching Point (SSP) such as a Mobile Switching Center (MSC), softswitch or telephone exchange, to provide the call notification, present options, and receive input from the RBT subscriber. Alternatively, the application server can also establish a call to the RBT subscriber and prompt then receive an input directly, provided there is an existing messaging facility that can notify, prompt and receive input from the RBT subscriber.

Figure 1:
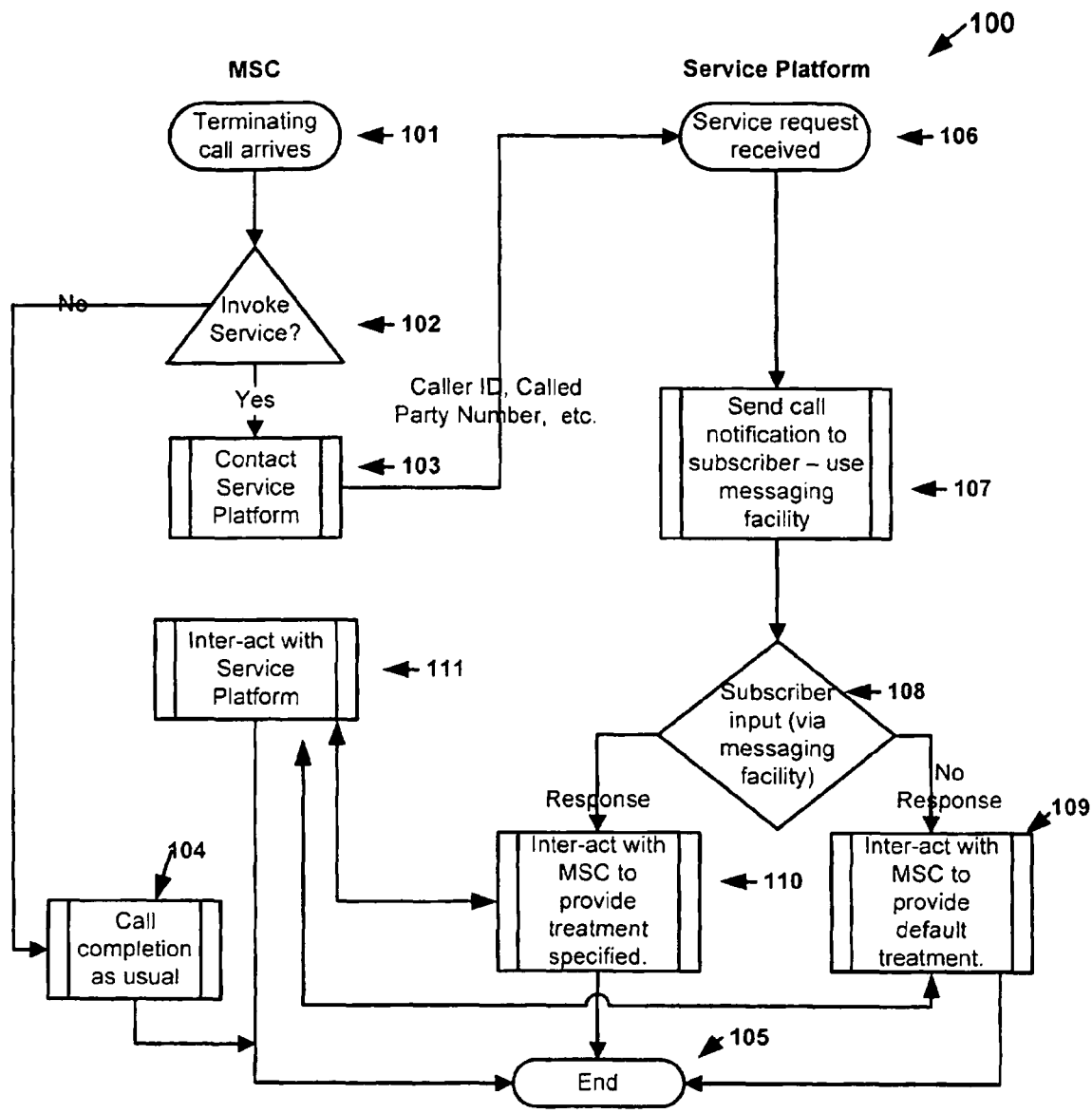
FIG. 1 illustrates a flow chart of the present invention.

FIG. 1 illustrates a flow chart 100 of the present invention, in combination with an existing Ring Back Tone (RBT) service. In this embodiment, the present invention is a terminating service—that is, the called party subscribes to the service, as is the case with RBT. As seen therein, a caller attempts to signal the station of a called party and the call arrives at a terminating exchange at step 101. In step 102, a determination is made as to whether a standard call treatment or call treatment based on called party preference is to be invoked. If not, then in step 104, conventional call processing occurs and the method terminates at step 105.

If call treatment based on the called party preference is to be invoked in step 102, then a service platform is contacted in step 103 and the service platform receives the request in step 106. This service platform can also be, and may be referred to as, an application server or, in traditional telephony terms, a service control point working in conjunction with an interactive voice response (IVR) unit or an intelligent peripheral (IP) player, which is a media server. The application server alone or with other servers, hosts computer software can be adapted to implement the present invention.

In step 107, the service platform sends the call notification to a subscriber using, e.g., a messaging facility. The subscriber is then provided options and prompted to input a response using, e.g., a messaging facility in step 108. The options include, but are not limited to, at least one of: immediate connection to the call; connect after x seconds, as determined by the subscriber; continue to play RBT until notified of call treatment; do not disconnect until notified of call treatment; forward to voicemail or to a third party; play announcement to caller and then terminate call; display a message to caller and then terminate the call; and change announcement or tone when current tone completes current cycle. Note that while the foregoing options are presented and acted upon, the call itself is not presented to the called party. If no response is received, then in step 109, the service platform interacts with an SSP, here an MSC, to provide a default treatment. The default treatment can be a network option applicable to all subscribers or it can be previously selected or specified by a subscriber. The method then ends at step 105.

If a response is received, then in step 110, the service platform interacts with the SSP, here an MSC, to provide the specified treatment. In such step, the service platform provides RBT treatment to a caller and simultaneously provides the called party treatment to the caller based on input collected from the RBT subscriber on a real-time basis. The call is then ended in step 105.

Figure 2:
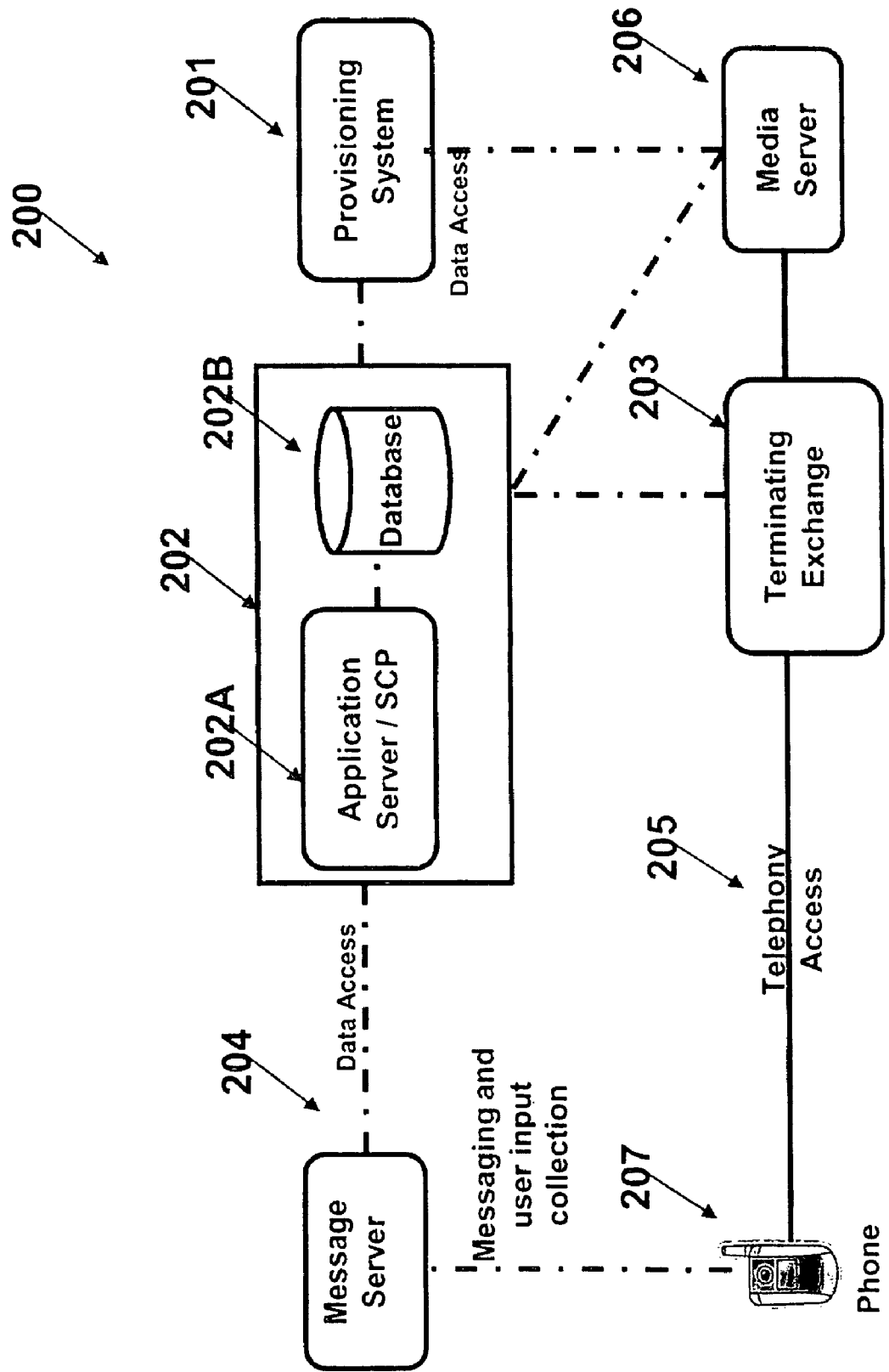
FIG. 2 is a block diagram of the present invention that implements the method seen in FIG. 1.

FIG. 2 is a block diagram 200 of the present invention that implements the method seen in FIG. 1. As seen therein, the subscriber subscribes to the service provided by the present invention over a provisioning system 201. The provisioning system 201 is coupled to an application server/application database 202 and a media server 206. If the subscriber has subscribed to the service facilitated by the present invention, called party preferences are stored at the application database 202B. Such treatment includes, but is not limited to, at least one of: immediate connection to the call; connect after x seconds, as determined by the subscriber; continue to play RBT until notified of call treatment; do not disconnect until notified of call treatment; forward to voicemail or to a third party; play announcement to caller and then terminate call; display a message to caller and then terminate the call; and change announcement or tone when current tone completes current cycle. Note that while the foregoing options are presented and acted upon, the call itself is not presented to the called party.

The application server 202A is a functional node of a telecommunications system and includes, but is not limited to, a service platform, an application server or service control point. Based on such information or data, callers are provided certain treatment depending on the options selected by the called party from station or terminal 207. Messaging and user input is received from station or terminal 207 at message server 204. The preferences are stored in, and invoked from database 202B.

When a terminating exchange 203 queries the application server 202A, the application server 202A checks the subscriber's preferences from the application database 202B, and notifies or directs the terminating exchange 203 as to what treatment the call should be given. Generally, the application server 202A and associated application database 202B maintain the set of preferences to be selected by the called party for the treatment of a call.

In the present invention, the application server/SCP 202 notifies the called party of the incoming call and prompts input from the subscriber as to the treatment that should be given to the caller. At this stage, a call to the subscriber has not yet been established. The call will be established only if the subscriber intends to answer the call as seen in FIG. 1 (step 110). Further, the response to the SSP can change depending on the input from the subscriber. Because the subscriber is given a number of call treatment options, the response to the SSP is dependent on the called party input. If the called party fails to provide an input, a default treatment is provided. The default treatment can be a network option applicable to all subscribers or it can be previously selected or specified by a subscriber. It is possible that the call may be diverted to a different location; the call may be delayed; the call may be terminated; or the normal signaling of the called party line may take place.

The present invention provides a number of advantages. These include: providing an enhanced user experience as the called party is able to select a call treatment when a call notification is received; the ability of a subscriber to use the service to manage incoming calls, providing a subscriber with a real-time call screening capability; providing a more efficient use of network resources; and ability to extend a call to a called party only if the caller is willing to accept the call. With the present invention, RBT type treatment is no longer restricted to the caller as the called party is also able to participate in the service.

While particular embodiments of the present invention have been described, it is not intended that the present invention be limited thereto, as it is intended that the invention be as broad in scope as the art will allow and that the specification be read likewise. While the apparatus of the invention is shown in block diagram format, it will be appreciated that the block diagram may be representative of and implemented by hardware, software, firmware, or any combination thereof. Moreover, the functionality of certain aspects of the block diagram can be obtained by equivalent or suitable structure. It will therefore be appreciated by those skilled in the art that yet other modifications could be made to the provided invention without deviating from its spirit and scope as claimed.

What is claimed:

1. A method of handling a call in a telecommunications system, comprising the steps of:
  storing call treatment options in a database;
  receiving a call signal at a terminating exchange;
  determining whether call treatment based on called party preference is to be invoked;
  if not, then performing conventional call processing;
  if call treatment based on called party preference is to be invoked, then contacting a Ring Back Tone (RBT) service platform, where the called party had previously subscribed to a RBT service;
  notifying the called party that a call is being signaled;
  prompting the called party to provide an input for treatment of the call based on call treatment options stored in the database, while the call treatment options are presented and acted upon by the called party the call itself is not presented to the called party;
  if input from the called party is received, providing the selected treatment;
  if input from the called party is not received, providing a default treatment, wherein the default treatment is either a network option applicable to all subscribers or is previously selected or specified by the called party; and
  interacting between the RBT service platform and the terminating exchange to connect a call to a media server to play a RBT for the calling party after the step of contacting the RBT service platform while the called party is selecting a call treatment option, where the played RBT content was previously selected by the called party.

2. The method of claim 1, wherein the step of determining whether call treatment based on called party preference is to be invoked is made by a service platform.

3. The method of claim 1, wherein the service platform is a an application server or, in traditional telephony terms, a service control point working in conjunction with an interactive voice response (IVR) unit or an intelligent peripheral (IP) player, which is a media server.

4. The method of claim 1, wherein service platform and SSP interact to provide the selected call treatment.

5. The method of claim 1, wherein the selected treatment is at least one selected from the group consisting of: immediate connection to the call; connect after a predetermined number of seconds, as determined by the subscriber; continue to play RBT until notified of call treatment; do not disconnect until notified of call treatment; forward to voicemail or to a third party; play announcement to caller and then terminate call; display a message to caller and then terminate the call;
and change announcement or tone when current tone completes current cycle.

6. The method of claim 1, wherein the notification of the call to the called party is selected from the group consisting of: a user-selected alerting tone, a vibration in silent mode, a text message or multimedia message.

7. The method of claim 1, wherein the called party is notified of the call through an existing messaging facility.

8. The method of claim 7, wherein the called party is sent a text via a Short Message System (SMS).

9. The method of claim 1, wherein the determination of whether to provide called party treatment is facilitated by a computer program embodied on a non-transitory computer readable medium executed by computer hardware, the computer program being internal to the RBT service platform.

10. The method of claim 1, wherein the service platform is selected from the group consisting of: a RBT service platform, an application server and a service control point.

11. The method of claim 1, wherein the method is provided as a service to a called party as a subscriber.

12. The method of claim 11, wherein the service is provisioned through an Internet portal.

13. The method of claim 11, wherein the service is provisioned by contacting the subscriber's service provider who then sets up the service.

14. A system for handling calls in a telecommunications system, comprising:
a Ring Back Tone (RBT) service platform having an application server/service control point and a database, the database storing call treatment options;
an exchange interacting with the service platform, the exchange is configured to:
receive a call signal;
determine whether call treatment based on called party preference is to be invoked;
if not, then performing conventional call processing;
if call treatment based on called party preference is to be invoked, then contacting the RBT service platform, where the called party had previously subscribed to a RBT service;
the RBT service platform is configured to:
notify the called party that a call is being signaled;
prompt the called party to provide an input for treatment of the call based on call treatment options stored in the database, while the call treatment options are presented and acted upon by the called party the call itself is not presented to the called party;
if input from the called party is received, provide the selected treatment;
if input from the called party is not received, provide a default treatment, wherein the default treatment is either a network option applicable to all subscribers or is previously selected or specified by the called party; and
interact with the exchange to connect a call to a media server to play a RBT for the calling party after the RBT service platform is contacted and while the called party is selecting a call treatment option, where the played RBT content was previously selected by the called party.

15. The system of claim 14, wherein the called party preferences is at least one selected from the group consisting of: immediate connection to the call; connect after a predetermined number of seconds, as determined by the subscriber; continue to play RBT until notified of call treatment; do not disconnect until notified of call treatment; forward to voicemail or to a third party; play announcement to caller and then terminate call; display a message to caller and then terminate the call; and change announcement or tone when current tone completes current cycle.

16. The system of claim 14, further including a provisioning system node.

17. The system of claim 14, further including a media server for playing Ring Back Tone (RBT) to the calling party while the called party is selecting a treatment for the call.

18. The system of claim 14, wherein the application server/service control point and a database comprises a functional node of a telecommunications system.

19. The system of claim 18, wherein the node is a service platform, an application server or service control point.

20. The system of claim 14, further comprising a computer program adapted to be executed by a processor that maintains the called party preferences.

21. A Ring Back Tone (RBT) service platform, comprising:
an application server/service control point and a database, the database storing call treatment options;
a computer program embodied on a non-transitory computer readable medium executed by computer hardware to:
notify a called party that a call from a calling party is being signaled, where the called party had previously subscribed to a RBT service;
prompt the called party to provide an input for treatment of the call based on call treatment options stored in the database, while the call treatment options are presented and acted upon by the called party the call itself is not presented to the called party;
if input from the called party is received, provide the selected treatment;
if input from the called party is not received, provide a default treatment, wherein the default treatment is either a network option applicable to all subscribers or is previously selected or specified by the called party; and
interact with an exchange to connect a call to a media server to play a RBT for the calling party after the step of contacting the RBT service platform while the called party is selecting a call treatment option, where the played RBT content was previously selected by the called party.

22. A method implemented by a Ring Back Tone (RBT) service platform for handling a call in a telecommunication system, the method comprising the steps of:
notifying a called party that a call from a calling party is being signaled, where the called party had previously subscribed to a RBT service;
prompting the called party to provide an input for treatment of the call based on call treatment options stored in the database, while the call treatment options are presented and acted upon by the called party the call itself is not presented to the called party;
if input from the called party is received, providing the selected treatment;
if input from the called party is not received, providing a default treatment, wherein the default treatment is either a network option applicable to all subscribers or is previously selected or specified by the called party; and interacting with an exchange to connect a call to a media server to play a RBT for the calling party after the step of contacting the RBT service platform while the called party is selecting a call treatment option, where the played RBT content was previously selected by the called party.

* * * * *